United States Patent [19]

Mueller et al.

[11] Patent Number: 5,430,710
[45] Date of Patent: Jul. 4, 1995

[54] ORDER PRESERVING TRANSMISSION OF DATA STREAMS

[75] Inventors: Lothar Mueller, Uster, Switzerland; Rainer Oechsle, Trier, Germany; Hong L. Truong, Richterswil, Switzerland

[73] Assignee: International Business Machines Corp., Armonk, N.Y.

[21] Appl. No.: 929,225

[22] Filed: Aug. 14, 1992

[30] Foreign Application Priority Data

Mar. 27, 1992 [EP] European Pat. Off. ........... 92810228

[51] Int. Cl.⁶ ................... H04J 3/14; H04M 7/00
[52] U.S. Cl. .......................... 370/16; 370/60; 370/94.1; 340/827; 379/221
[58] Field of Search ............ 370/16, 54, 58.1, 60, 370/60.1, 61, 85.1, 85.6, 85.9, 94.1; 371/8.1, 8.2, 11.1, 32; 340/825.01, 825.03, 826, 827; 379/220, 221, 272, 273, 279

[56] References Cited

U.S. PATENT DOCUMENTS

| | | | |
|---|---|---|---|
| 4,617,657 | 10/1986 | Drynan et al. | 370/60 |
| 4,669,113 | 5/1987 | Ash et al. | 379/221 |
| 4,788,721 | 11/1988 | Krishnan et al. | 379/221 |
| 4,862,496 | 8/1989 | Kelly et al. | 379/221 |
| 5,222,061 | 6/1993 | Doshi et al. | 370/60 |

FOREIGN PATENT DOCUMENTS

0224895 11/1986 European Pat. Off. .
8504300 9/1985 WIPO .

*Primary Examiner*—Alpus Hsu
*Attorney, Agent, or Firm*—Joscelyn G. Cockburn

[57] ABSTRACT

Described are methods which preserve the order of the data frames within a data stream if the data stream is switched from one link to another. The first method achieves the order preservation by numbered switch frames that have to be exchanged between the nodes before the link switching is actually performed. In the second method, the switching is only prepared by exchanging special frames which indicate "clean" links. Actual switching takes place by just using an already prepared, i.e., "clean" link.

8 Claims, 6 Drawing Sheets

ORDER PRESERVING TRANSMISSION OF DATA STREAMS

DESCRIPTION

1. Field of the Invention

In general, this invention relates to data transmission in a network and concerns particularly the transmission of data between two nodes within such a network. In such networks, two nodes are often connected by two or more links, be it for the reason of security, of availability or of reliability. If, in such a network, switching from any one link to another (between the same two nodes) occurs within one and the same data stream, in other words, if a data stream is switched from one link to another, it is in many applications imperative that the order of the data frames within said particular data stream is preserved in some way. If this is not achieved, the data will not be received correctly; consequently, a time consuming retransmission of the whole data stream may be necessary or, if the disorder is not detected, data may be corrupted. In other words, the requirement of a single link appearance of a transmission group, i.e. a multi-link connection between nodes, enforces some procedure for preserving the order of the frames.

2. Background

The problem of order preservation in data streams when switching from one link to another in transmission groups has been recognized before. IBM's System Network Architecture (SNA) is an example. Tutorials on the solution used in SNA are (1) J. Martin: SNA, IBM's Networking Solution, Prentice Hall, Englewood Cliffs, N.J. USA, 1987, and (2) A. Meijer: System Network Architecture, A Tutorial, Pittman Publishing, London, UK, 1987. The SNA method is to attach a sequence number to each data frame and reorder the frames at the receiving node according to this number.

Though it is a rather safe method, this solution, however, has disadvantages. The numbering of each and every data frame occupies space and time that is lost for data, i.e. payload transmission. Further, both the sending and the receiving node have to keep track of the numbers given, permanently frame by frame, in other words, there is a substantial administration effort attributable solely to the order preservation requirement.

Further, in order to rearrange potentially unordered frames in the receiver, buffering of frames must be provided which occupies storage resources and needs additional administrative overhead. A particular problem is the wrap-around necessary when the frame numbers reach the upper limit, i.e. when the maximum capacity of the order number field or section in each frame is reached.

More details on the SNA concept are described under the heading Introduction below.

OBJECTS OF THE INVENTION

One object of the invention is to overcome the above mentioned deficiencies of the method given in the prior art.

Another object is to devise a method that, given certain conditions that the data link fulfils, achieves order preservation of the transmitted data frames with a minimum of "administrative" data transmission between the two nodes concerned.

A further object is to enable a distribution of the data to be transmitted onto selected links according to practically any governing rule. E.g. according to speed requirements, if links with different transmission speeds are used; according to security requirements in networks where the security within a transmission group varies; or according to economic patterns in a network with differently priced transmission links; or any combination of the above and other rules.

Assuming that data streams can be identified, that it is sufficient to guarantee order preservation only for each data stream and that frame loss is tolerable, the new solution disclosed here for data streams groups is a very adaptive and well controllable way for sending data over transmission groups.

SUMMARY OF THE INVENTION

In brief, the invention concerns a new method for link switching when transmitting a data stream between two nodes of a network having multiple parallel links. During the transmission, data streams are assigned to links; the sender transmits data only over a so-called active link and the receiver accepts data only from an active link.

To obtain the desired flexibility, the method for order-preserving shifting of the data stream from one link to another link—the link-switching—includes a sequence of basic steps, namely generating a special request in the sending node (sender), attaching a sequence number to said request, transmitting said request with its number to the receiving node (receiver) over at least one currently inactive link, determining whether a received request carries a higher sequence number than a request received before (and is thus acceptable), if so, sending to the sender, over said currently inactive link, a special response with the sequence number of said received request, and determining, in the sender, when receiving a response, whether its sequence number matches the sequence number seal with the last request and is thus acceptable, depending on the result of at least one determining step, activating a so far inactive link to transmit the data stream.

The subclaims define two possible approaches, both assigning each data stream to a particular link. The first method achieves this by numbered switch frames that first have to be exchanged between the nodes before the link switching actually can take place. In the second method, the switching is only prepared by exchanging special frames. The actual switching takes place by just using an already prepared link. Both solutions are efficient, flexible, and order preserving, thus achieving the objects of the invention.

INTRODUCTION

Connecting two adjacent network nodes by more than a single link is an appropriate way of increasing the communication capacity and reliability between the two nodes. Such a set of parallel links is usually called a transmission group. In the prior art, in SNA, for example, the bottom sublayer of the Path Control layer (corresponding to OSI layer 3, the network layer) which is called the Transmission Group sublayer, combines one or more parallel SDLC (Synchronous Data Link Control) links and makes them appear to higher layers as a single link. Consequently the FIFO nature of a single link has to be guaranteed for the transmission group as a whole by the Transmission Group sublayer.

In the SNA approach, this is achieved as follows. A sequence number is attached to each frame at the sender side. At the receiver side, the frames are ordered according to the sequence numbers. If a frame is missing, it is retransmitted over another link until it is successfully transmitted or the maximum retry count is reached. Because of the transmission of the same frame on different links in case of transmission errors, there is the problem that no easy wrap-around of the sequence numbers as in SDLC is possible (sequence numbers are in the range from 0 to 4095). SNA solves this problem by quiescing all links of the transmission group when the .maximum number is reached. The receiver first sends a sequence number wrap acknowledgement. The sender then sweeps all links, i.e. makes sure that there are no old frames in the links anymore, sends a frame with sequence number 0 and sweeps the links again. More detailed information on this topic can be found in the textbooks on SNA, cited above, or in other SNA literature.

The overhead of each frame carrying an additional sequence number, the procedures of frame resequencing, retransmission on different links and of the sequence number wrap-around are considerable.

This invention discloses two more efficient solutions for the transmission of data over transmission groups, provided that the assumptions described in the following section hold.

ASSUMPTIONS

The frames to be transmitted over a transmission group can be identified as belonging to different data streams and order preservation has to be guaranteed only for each individual data stream, but not globally for all frames. Such a data stream may be identified by some kind of a connection identifier in the frame or by a pair of end points, as for example the pair destination MAC (Medium Access Control) address and destination LLC SAP (Logic Link Control, Service Access Point), source MAC address and source LLC SAP in case of two LANs being remotely bridged over a transmission group.

As will be seen below, for each data stream a certain amount of state information has to be remembered. So, if the granularity of different recognizable data streams is too fine, the amount of state information may become very large. In this case, the granularity can be made coarser by grouping several data streams together, e.g. by taking into account only the first n most significant bits of a connection identifier or, in case of remote bridging, by identifying a data stream only through the pair (destination MAC address, source MAC address) disregarding the LLC SAPs.

A possible loss of frames is tolerable. Thus, no retransmission scheme is implemented. The underlying assumption is that this is done on an end-to-end basis, e.g. by the LLC in case of remote bridging. Note that a protocol that tolerates frame losses is not necessarily also able to deal with frame reordering. LLC may be taken as an example.

A data stream is completely independent from its corresponding reverse data stream. In the following payload data transmission is thus considered only for one direction, from a sender to a receiver node.

GENERAL CONCEPT OF THE INVENTION

Because of the first assumption mentioned in the previous section, namely that different data streams can be identified and that it is sufficient to preserve the frame order only for each data stream, a simple exploitation of a transmission group is just to distribute the data streams onto the links of the group, typically sending more than one data stream over the same link, but never sending a single data stream over several links (because of order preservation difficulties). What is needed is a simple table that assigns a link to each data stream. An obvious disadvantage of this approach is the loss of flexibility as compared to the method described for SNA. E.g., if one link is heavily loaded because of a tremendous increase of traffic for the data streams assigned to this link while the utilization of other links is rather low, a need arises to balance the traffic load within the transmission group. It is thus required to be able to dynamically shift a data stream from one link to another one without corrupting the order. This action will be called link switching. Here, two methods are described how to achieve such a link switching.

In both methods, the sender and the receiver store for each data stream the currently used link called the active link, and a sequence number counting the number of switching requests for this data stream. The sender transmits the payload data for a given data stream only on the currently active link and the receiver accepts frames for a given data stream only from the currently active link.

In the first solution, explicit switch request frames are sent from the sender to the receiver in order to inform the receiver that the active link shall be changed. Switch request frames are always sent over that link to which the data stream shall be switched, i.e. they are sent over the 'new' link. On receiving such a switch request frame, the receiver changes the active link to that link on which the request frame arrived for the data stream as indicated in the request. In addition, the receiver replies to such switch requests by sending switch responses back also over the 'new' link. The sender then also changes his active link and thereafter starts to forward frames for the corresponding data stream on the new link. Because such switch request and response frames may be lost or heavily delayed, it may be decided to resend them. The loss or delay of switch frames may be taken as an indication that switching to this particular link is not a good idea. So another link may be selected to switch to. This means that switch request frames are resent, possibly over different links. In order to decide at the receiver side which request frame is the most recent one, a sequence number is attached to each switch frame (as it is done in SNA for each data frame). The receiver only switches the link and sends replies after having received a switch request frame with a sequence number higher than the sequence numbers of all previously received frames. This sequence number is also added to each switch response frame.

Similarly, the sender only switches to the new link if a switch response is received with the same sequence number as the last sent switch request. Note that the sequence numbers are handled on a per data stream basis. Note also that frames sent on the old link while the receiver already has switched to the new link, are simply lost. The assumption is, however, that such a loss is tolerable. The typical way of using this method, however, is to stop transmitting until the switch response has arrived.

Thus, in the first solution, a switch request and response first have to be exchanged. The second solution presented just avoids this delay. Instead of exchanging switch request and response frames, the candidate links are swept by exchanging sweep request and response frames. These sweep frames, however, do not trigger the change of the active link for a given data stream, but the reception of such a sweep request and response frame is only taken as an indication by the receiver and the sender, respectively, that the given link is clean and a switch to this link is now possible. The actual switching takes place by simply using from now on a clean link at the sender side. The receiver switches to the new link upon receiving the first frame over a new, clean link. After having switched a link, all links are considered to be dirty again. This is done in the same way at the sender and at the receiver side. As in the previous proposal, sweep requests and responses carry sequence numbers to distinguish old and new sweep frames. The sender's sequence number is increased for each switching action done at the sender side, but not for each sweeping frame sent! The receiver accepts a sweeping frame arriving over a yet dirty link and carrying the current sequence number, i.e. the link is added to the set of clean links at the receiver side. Similarly, the sender adds a link to the set of clean links if a sweep response arrives carrying the current sequence number. This allows that more than one link can be swept and considered clean. There are thus several links ready to potentially take over the data stream which is very important in a critical situation. Like the sender, the receiver increases its sequence number with each switching action done. If the receiver gets a sweep request frame with a sequence number larger than the current one, it notices that one switch was missed.

Consequently, this case is handled like a switch, i.e. all links are considered dirty except the one for which the sweep arrived. Note that the active link does not always have to be clean. The state of a link determines whether a data stream can be switched to that link or not. This state, however, has no meaning for the active link. So, e.g. in the case mentioned above where the receiver notices a missing switch and considers all links to be dirty except the one for which the sweep arrived, the active link stays the same and the receiver still accepts data frames on this active link until an actual switch takes place, i.e. until a data frame arrives on a different, clean link.

Obviously, in the second solution, a switching can be done immediately if there are clean links available. This advantage, however, has to be paid by storing for each data stream which link is dirty and which one is clean. So there is a clear trade-off between the two solutions. Which method to use can only be decided if the requirements for a special application are known.

It shall be pointed out that there is no method for the wrap-around of the sequence numbers. It is not needed because the sequence number only counts the switchings per data stream and not globally all individual frames, thus its growing is much smaller, and—because a sequence number is transmitted only in switch or sweep frames, it is thus affordable to use as many bits as needed.

In the following two sections, a detailed description of the methods outlined above is presented with reference to the drawings.

DETAILED DESCRIPTION OF EMBODIMENT I

Figure 2:
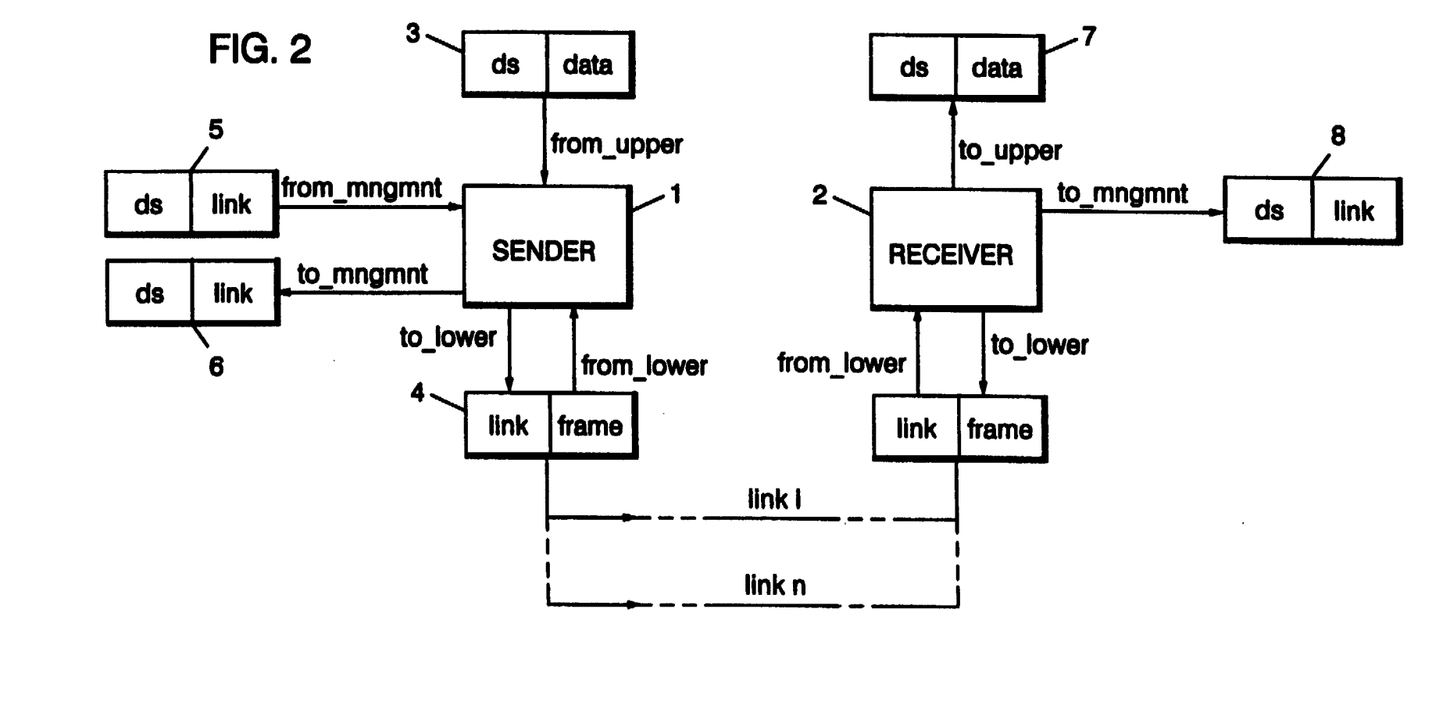
FIG. 2 shows sender and receiver and their connection according to solution I of the present invention.

The complete method is described by two processes, a sender and a receiver process. They interact with their local system environment by sending and receiving messages 13, 15, 16, etc. to and from operating systems channels as depicted in FIG. 2. (For the terminology: "frames" are exchanged between the two nodes; "messages" are exchanges within a node to control the processes.)

Each frame (FIG. 1) exchanged between sender 1 and receiver 2 over the links contains at least three components, preferably in three fields of the frame. First, a type-of-frame indicator (type) that determines which type of frame it is. Three types exist: DATA frames, containing payload data; SWITCH REQUEST frames, identifying a request from a sender, explained in detail below; and SWITCH RESPONSE frames, identifying a response from a receiver on such a sender request, also explained below in detail. Second, a data stream identifier (ds) that identifies the data stream to which the frame belongs. Third, an information part (info) which either contains the payload data if the frame is of the DATA type, or a sequence number if the frame is of the SWITCH type.

Sender 1 (FIG. 2) receives messages 3 from the upper layer through the from_upper channel. Messages 3 contain a data stream identifier (ds) and the payload (data) to be transmitted. In addition, the sender process sends and receives messages 4 to and from the lower layer through the channels to_lower and from_lower, respectively. These messages contain a link section (link) and a frame (frame) according to FIG. 1. The meaning of such a message is that the frame is to be sent or was received over the given link. The frame itself carries the type field, indicating whether it is a (pure) data frame or a switch request/response frame, the data stream identification and an information field which is interpreted as payload for data frames and as a sequence number for switch frames.

Also, a management process may send switch request messages 5 to the sender process through the channel from_mngmnt. These messages 5 simply contain the data stream identifier (ds) and the new link (link). Whenever a switch has been done successfully, this is reported to the management by messages 6 through the channel to_mngmnt.

The interaction of receiver 2 with its environment is very similar to the sender process with the exception that receiver 2 sends messages 7 to the upper layer, via the channel to_upper, instead of receiving from it.

Each message 7 is an equivalent to message 3 that the sender received from the upper layer. Also, receiver 2 reports switching actions by messages 8 to the management process (via the channel to_management) but does not accept any commands from it. These messages 8 are equivalent to the messages 6 on the sender side.

Figure 5A:
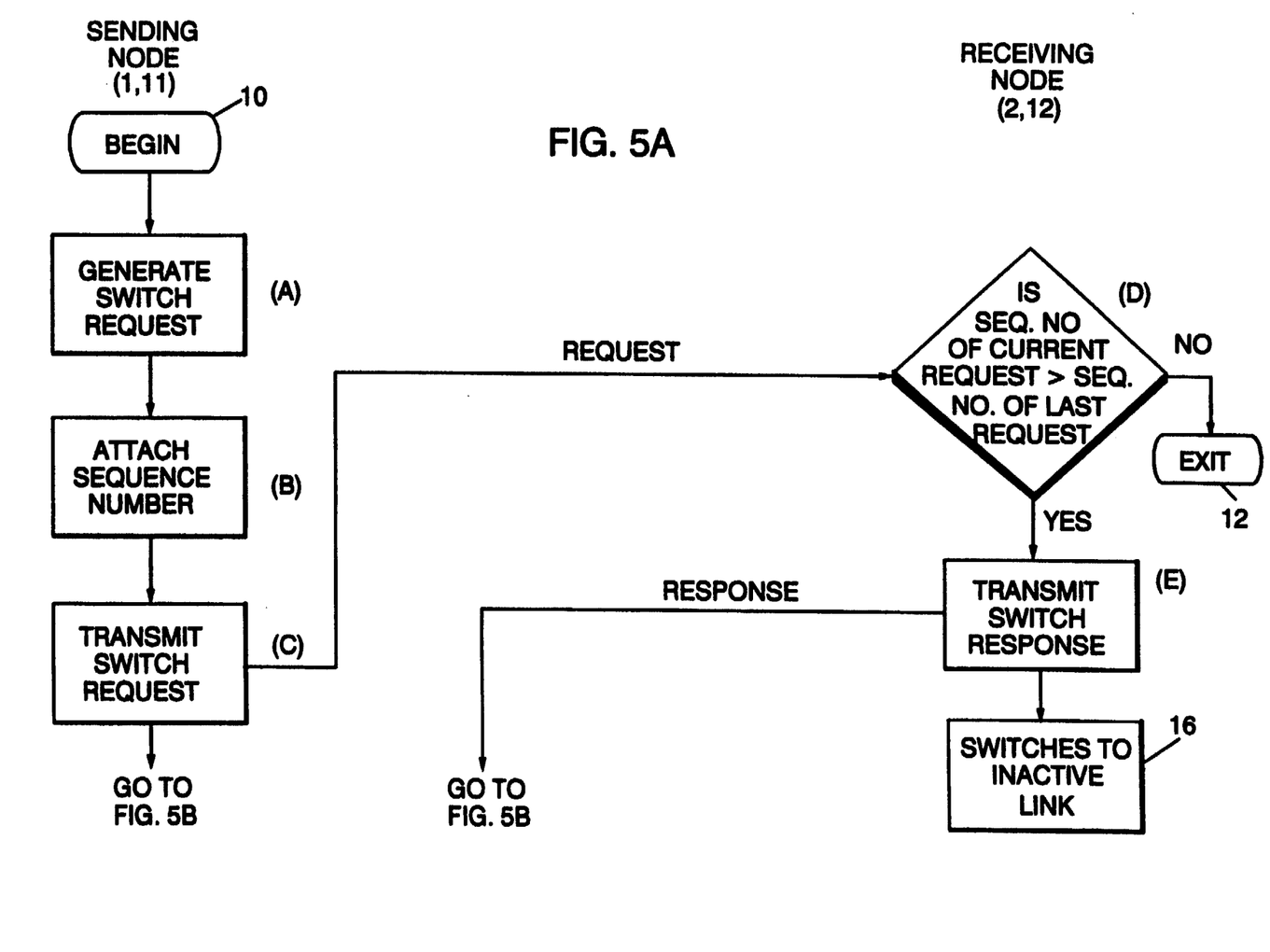
FIGS. 5A and 5B show a flow chart of the process steps for solution I of the present invention.
Figure 5B:
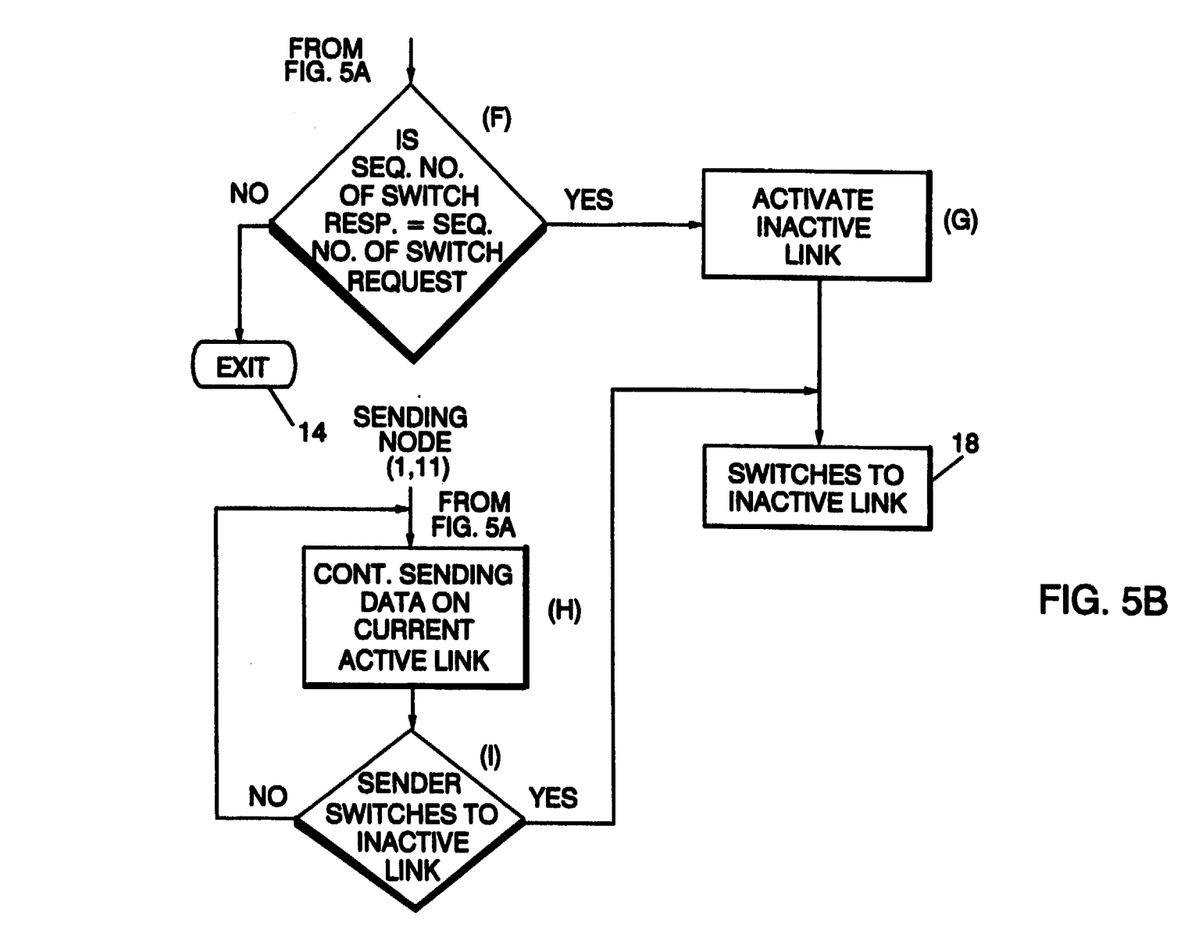

FIGS. 5A and 5B show flow charts of the process described in embodiment 1. The sending node is labeled 1, 11 and the receiving node is labeled 2, 12. Likewise, the process steps are labeled with alphabetical characters similar to those used to identify the respective steps in claims 1-3. Block 10, labeled begin, is the initial step where the process begins and descends into step A. In step A, the process in the sending node generates the switch request. The process then descends into step B where it attaches sequence number to the generated switch request. The format of the switch request signal is set forth in FIG. 1. The process then descends into step C where it transmits the switch request to the receiving node. At the receiving node, the process enters step D where it determines whether a receive switch request carries a higher sequence number than a switch request received before and is thus acceptable. If the result of the determining step is no, the process descends into block 12 and exits. If the sequence number is higher than the previously received request, the program descends into step E where it transmits a switch response to the sending node. The switch response forces the process into step F (FIG. 5B) where it determines whether its sequence number matches the sequence number sent with the last switch request and is thus acceptable. If the response is no, the process descends into block 14 and exits. If the response is yes, the process enters block G where it activates the inactive link. The process then descends into step 16 (FIG. 5A) where it switches transmission to the inactive link.

Still referring to FIGS. 5A and 5B with respect to transmit switch request (block C), when the process sends a request to receiving node 2, the process goes to step H, FIG. 5B. In step H, the program continues sending data on the current active link as is stated in claim 3. The program then descends into step I, where the sending node switches to the inactive link. If the sending switches to the inactive link, all transmission from the sending node is transmitted thereafter on the inactive link. Likewise, if the sender does not switch to the inactive link, it continues to send information on the current active link.

In the following, the relevant control information held at the sender and at the receiver side together with its initialization is shown in C syntax:

```
typedef struct {LINK active_link; NUMBER seqno} cntrl;
cntrl sendcntrl [MAX_DS],receivecntrl [MAX_DS];
init( )
{
    for{i = 0; i < MAX_DS; i++)
    {
        sendcntrl [i].active_link = initial_link;
        sendcntrl [i].seqno = 0;
        receivecntrl [i].active_link = initial_link;
        receivecntrl [i].seqno = 0;
    }
}
```

The sender and receiver processes are also written in C with the following extensions.

Send() and receive() calls are used for sending and receiving to and from the operating systems channels. In order to wait for the arrival of a message on more than one channel, the notation $$ch = receive(ch1 \text{ or } ch2 \text{ or } \ldots chn, msg);$$

is used where ch gives the channel on which the message finally was received.

Figure 1:
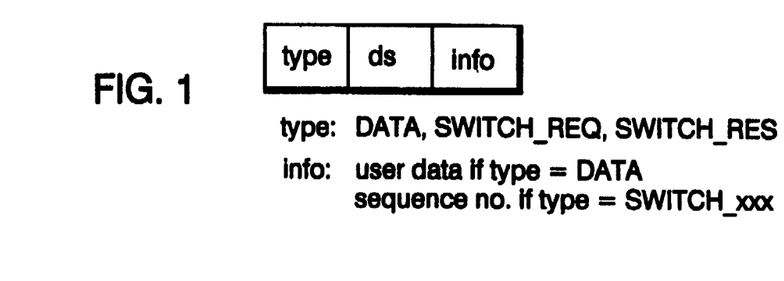
FIG. 1 shows a typical frame with its various sections used in solution I of the invention.

Depending from which channel a message was received, the components may be accessed through the component names as introduced in FIG. 1. E.g., if the message msg was received from channel from_upper, its components are msg.ds and msg.data, whereas the components of a message msg received from from_lower are msg.link and msg.frame.

A message to be sent is simply indicated by giving its components enclosed in <...>.

Note also that there is no timeout and retry built into the code of the sender process in order to protect against lost switch request or response frames. This timeout supervision and triggering of retries has to be all done by the management process. This simplifies the sender code in a significant way. Here is the sender process first.

```
process sender( )
{
    forever
    {
        received = receive(from_mngmnt or from_upper or ...
            ... from_lower,msg);
        if(received == from_upper)
        // just send the data on the active link
        {
            ds = msg.ds;
            info = msg.data;
            frame = <DATA,ds,info>;
            link = sendcntrl[ds].active_link;
            send(to_lower,<link,frame>);
        }
        else if(received == from_mngmnt)
        // initiate outgoing link switching
        {
            ds = msg.ds;
            sendcntrl[ds].seqno++;
            seqno = sendcntrl[ds].seqno;
            frame = <SWITCH_REQ,ds,seqno>;
            new_link = msg.link;
            send(to_lower,<new_link,frame>);
        }
        else if(received == from_lower)
        // outgoing link switching has been done
        {
            new_link = msg.link;
            frame = msg.frame;
            ds = frame.ds;
            if((frame.type == SWITCH_RES)
                && (frame.info == receivecntrl[ds].seqno))
            // correct frame type and correct sequence number
            {
                sendcntrl[ds].active_link = new_link;
                send(to_mngmnt,<ds,new_link>);
            }
        }
    }
}
```

And here follows the receiver process, again in C syntax.

```
process receiver ( )
{
    forever
    {
        receive(from_lower,msg);
```

-continued

```
    link = msg.link;
    frame_in = msg.frame;
    ds = frame_in.ds;
    if(frame_in.type == DATA)
    // data has been received -> pass to user if received on
                                the active link
    {
      if(link == receivecntrl[ds].active_link)
        send(to_upper,<ds,frame_in.info>);
    }
    else if(frame_in.type == SWITCH_REQ)
    // switch incoming active link if correct sequence number
    { if(frame_in.info > sendcntrl[ds].seqno)
      {
        receivecntrl[ds].seqno = frame_in.info;
        receivecntrl[ds].active_link = link;
        frame_out = <SWITCH_RES,ds,frame_in.info>;
        send(to_lower,<link,frame_out>);
        send(to_mngmnt,<ds,link>);
      }
    }
  }
}
```

This completes the description of embodiment I.

DETAILED DESCRIPTION OF EMBODIMENT II

Figure 3:
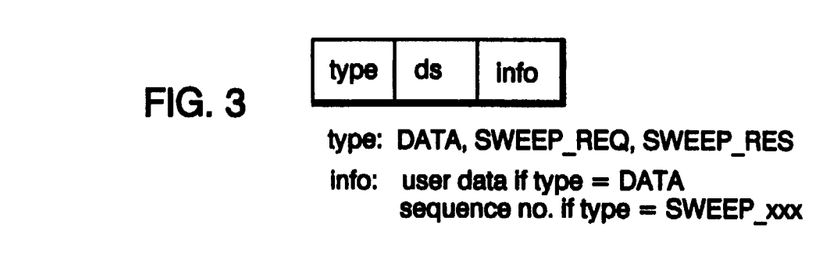
FIG. 3 shows a typical frame with its various sections used in solutions II of the present invention.
Figure 4:
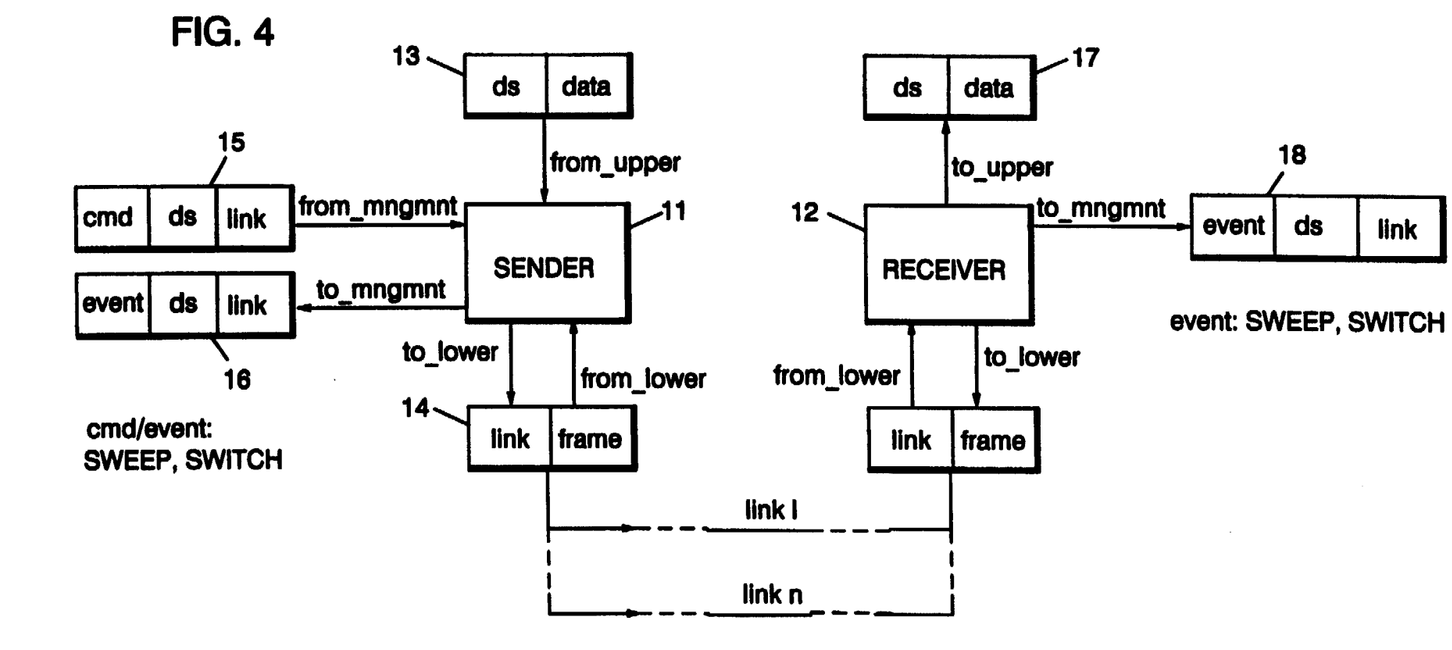
FIG. 4 shows sender and receiver and their connection according to solution II of the present invention.

In this section, the second solution is presented (FIGS. 3 and 4). The main difference with respect to the interaction of the processes with their local system environment is that the messages exchanged with the management process now have an additional component or field (cmd/event) indicating whether it has to be interpreted as a sweep or switch message. In addition, the types of the frames transmitted over the links are now either data frames, or sweep request/sweep response frames instead of switch frames.

Again, the complete method is described by two processes, a sender and a receiver process. They interact with their local system environment by sending and receiving frames shown in FIG. 3 to and from operating systems channels as depicted in FIG. 4.

Each frame, as shown in FIG. 3, contains at least three components, preferably in three fields of the frame. First, there is a type-of-frame indicator (type) that determines which type of frame it is. Three types exist: DATA frames, containing payload data; SWEEP REQUEST frames, identifying a particular request from a sender, explained in detail below; and SWEEP RESPONSE frames, identifying a response from a receiver on such a sender request, also explained below in detail. Second, a data stream identifier (ds) that identifies the data stream to which the frame belongs. Third, an information pad (info) which either contains the payload data, if the frame is of the DATA type, or a sequence number, if the frame is of the SWEEP type.

The interaction of the two processes, the sender and the receiver process, with their upper and lower layers is exactly the same as described for the first embodiment in connection with FIGS. 1 and 2, with the following important exception. As indicated above, the type field of each frame shown in FIG. 3 can have one of the values DATA, SWEEP_REQ, or SWEEP_RES (instead of DATA, SWITCH_REQ, or SWITCH_RES as in embodiment I). The obvious reason for this is that in the second solution no switch requests and responses are exchanged, but sweep requests and responses. As before, data type frames carry data in the info field, and sweep request and response frames carry a sequence number in the info field.

Thus, an important difference to the previous embodiment i is the interaction of sender 11 and receiver 12 with their management processes. This is due to the fact that management now can give two different commands to the sender process: one (SWEEP) that requests sender 11 to sweep a link for a certain data stream, and another command (SWITCH) which actually switches a data stream to a new link. For that purpose, messages 15 sent from the management process via the from_management channel have an additional command field cmd, namely to distinguish sweep (SWEEP) and switch requests (SWITCH). A sweep request triggers the sender to exchange sweep request and response messages with its receiver process, whereas the switch request results in a purely local action, namely to use the indicated link for future outgoing frames belonging to the indicated data stream (provided the link is clean). Likewise, the messages sent from sender 11 and receiver 12 to their management processes also-have an additional event field (EVENT) to indicate if a sweep or a switch has been successfully carried out.

Sender 11 (FIG. 4) receives messages 13 from the upper layer through the from_upper channel. Each message 13 contains a data stream identifier (ds) and the payload (data) to be transmitted. In addition, the sender process sends and receives messages 14 to and from the lower layer through the channels to_lower and from_lower, respectively. These messages contain a link section (link) and a frame (frame) according to FIG. 3. The meaning of such a message is that the frame is to be sent or was received over the given link. The frame itself carries the type field, indicating whether it is a (pure) data frame or a sweep request/response frame, the data stream identification and an information field which is interpreted as payload for data frames and as a sequence number for sweep frames.

As already addressed above, a management process may send sweep request messages 15 to the sender process through the channel from_mngmnt. Other than in the first solution, these messages 15 contain the data stream identifier (ds), the new link (link), and a command (cmd), indicating, whether a switch or sweep is to be made. Whenever a switch or sweep has been done successfully, this is reported to the management by a message 16 through the channel to_mngmnt. This message 16 carries an event field, the contents of which (either SWEEP or SWITCH) indicates to the sender management that either a sweep or a switch was carried out.

The interaction of receiver 12 with its environment is again very similar to the sender process with the exception that receiver 12 sends messages 17 to the upper layer, via the channel to_upper, instead of receiving from it. Each message 17 is an equivalent to message 13 that sender 11 receives from the upper layer. Also, receiver 12 reports switching actions by messages 18 to the management process (via the channel to_management) but does not accept any commands from it. These messages 18 are equivalent to the messages 16 on the sender side and carry the respective information (either SWEEP or SWITCH) in an event field.

Figure 6A:
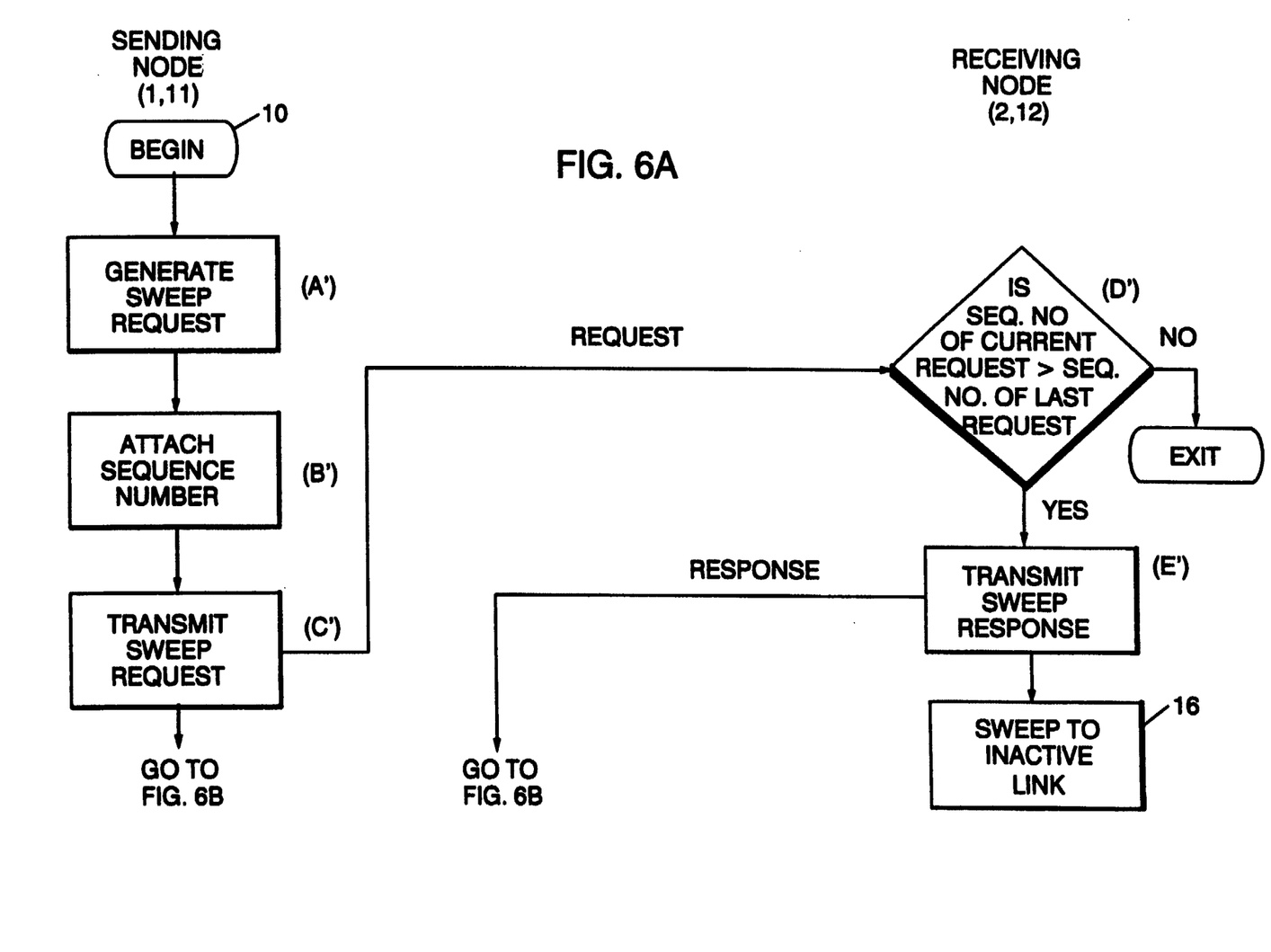
FIGS. 6A and 6B show flow charts of the process steps for solution II of the present invention.
Figure 6B:
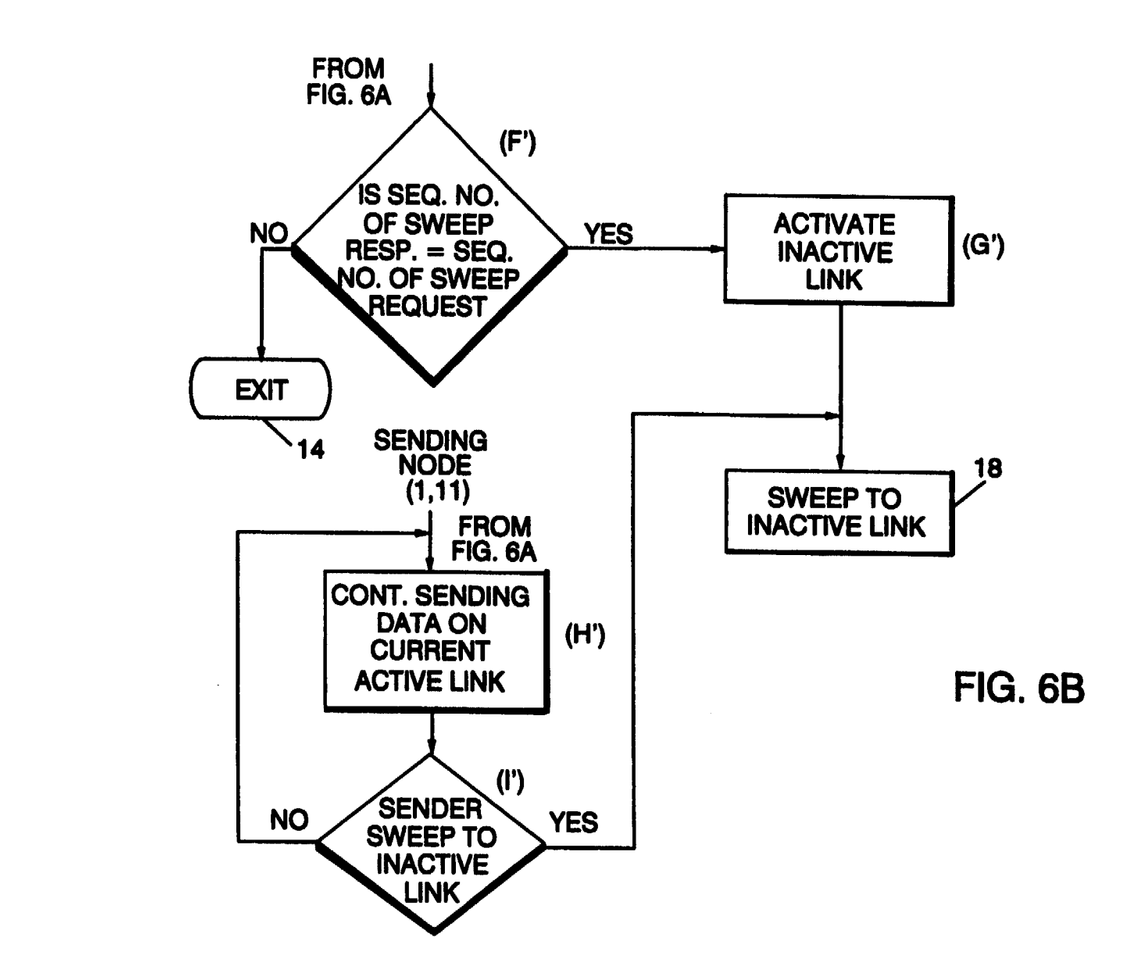

FIGS. 6A and 6B show a flow diagram of the process steps for Solution II according to the teaching of the present invention. As described above, in the second implementation of the present invention, the switching is only prepared by exchanging special frames which indicate "clean" links. Actually, switching takes place by just using an already prepared (i.e., clean link). In this regard, the flow chart in FIGS. 6A and 6B is substantially similar to the flow chart in FIGS. 5A and 5B. In particular, in FIGS. 6A and 6B "sweep" is substituted for "switch" and each of the alphabetical characters in FIGS. 6A and 6B are labeled with a prime notation to indicate that it relates to a different figure. Otherwise, the description above relative to FIGS. 5A and 5B is applicable to FIGS. 6A and 6B with the changes identified above incorporated. In view of the similarity, a restatement of the description will not be given here.

The control information stored at each side now contains in addition for each data stream the state of the links (clean or dirty). This information and its initialization is shown below, as usual in C notation. In the following, the relevant control information held at the sender and at the receiver side together with its initialization is shown in C syntax:

```
typedef struct {
    LINK active_link;
    NUMBER seqno
    enum {DIRTY,CLEAN} state[MAX_LINKS];
} cntrl;
cntrl sendcntrl[MAX_DS],receivecntrl[MAX_DS];
init( )
{
    for(i = 0; i < MAX_DS; i++)
    {
        sendcntrl[i].active_link = initial_link;
        sendcntrl[i].seqno = 0;
        receivecntrl[i].active_link = initial_link;
        receivecntrl[i].seqno = 0;
        for (j = 0; j < MAX_LINKS; j++)
        {
            sendcntrl[i].state[j] = CLEAN;
            receivecntrl[i].state[j] = CLEAN;
        }
    }
}
```

Finally the sender and receiver processes are as follows:

```
process sender( )
{
    forever
    {
        received = receive(from_mngmnt or from_upper
                    or from lower,msg);
        if(received == from_upper)
        // just send the data on the active link
        {
            ds = msg.ds;
            info = msg.data;
            frame = <DATA,ds,info>;
            link = sendcntrl[ds].active_link;
            send(to_lower,<link,frame>);
        }
        else if(received == from_mngmnt)
        // switch to clean link or initiate link sweeping
        {
            if(msg.cmd == SWITCH)
            {
                link = msg.link;
                ds = msg.ds;
                if(sendcntrl[ds].state[link] == CLEAN)
                {
                    sendcntrl[ds].seqno++;
                    sendcntrl[ds].active_link = link;
                    for(j = 0; j < MAX_LINKS; j++)
                        sendcntrl[ds].state[j] = DIRTY;
                    send(to_mngmnt,<SWITCH,ds,link>);
                }
            }
            else if(msg.cmd == SWEEP)
            {
                link = msg.link;
                ds = msg.ds;
                seqno = sendcntrl[ds].seqno;
                frame = <SWEEP_REQ,ds,seqno>;
                send(to_lower,<link,frame>);
            }
        }
        else if(received == from_lower)
        // outgoing link sweeping has been done
        {
            link = msg.link;
            frame = msg.frame;
            ds = frame.ds;
            if(frame.type == SWEEP_RES)
                && (frame.info == sendcntrl[ds].seqno))
            // correct frame type and correct sequence number
            {
                sendcntrl[ds].state[link] = CLEAN;
                send(to_mngmnt,<SWEEP,ds,link>);
            }
        }
    }
}
```

```
}
process receiver( )
{
  forever
  {
    receive(from__lower,msg);
    link = msg.link;
    frame = msg.frame;
    ds = frame = ds;
    if(frame.type == DATA)
    // data has been received -> pass to user if received on
                              the active link
    {
      if(link == receivecntrl[ds].active__link)
        send(to__upper,<ds,frame.info>);
      else if(receivecntrl[ds].state[link] == CLEAN)
      {
        receivecntrl[ds].seqno++; receivecntrl[ds].active__link =
        link;
        for(j = 0; j < MAX__LINKS; j++)
          receivecntrl[ds].state[j] = DIRTY;
        send(to__mngmnt,<SWITCH,ds,link>);
      }
    }
    else if(frame.type == SWEEP__REQ)
    // sweep incoming active link if correct sequence number {
      if(frame.info >= sendcntrl[ds].seqno)
      {
        if(frame.info > sendcntrl[ds].seqno)
        {
          receivecntrl[ds].seqno = frame.info;
          for(j = 0; j < MAX__LINKS; j++)
            receivecntrl[ds].state[j] = DIRTY;
        }
        receivecntrl[ds].state[link] = CLEAN;
        frame = <SWEEP__RES,ds,frame.info>;
        send(to__lower,<link,frame>); send(to__mngmnt,<ds,link>);
      }
    }
  }
}
```

To summarize, the disclosed transmission groups are an appropriate way to increase the communication capacity and reliability between two network nodes. The requirement of a single link appearance of such a group enforces some procedure for preserving the order of the frames. The prior art SNA method is to attach a sequence number to each frame and reorder the frames at the other side according to this number. Under the assumption that several data streams can be identified, that it is sufficient to guarantee order preservation only for each data stream and that frame loss is tolerable, the new approaches allow a flexible and efficient transmission of data streams over transmission groups. Both approaches assign each data stream to a link. For flexibility reasons, a possibility is added that allows an order preserving shifting of a data stream from one link to another one which is called link switching. The first method achieves this by numbered switch frames that first have to be exchanged between the nodes before the link switching actually can take place. In the second, faster method, the switching is only prepared by exchanging special frames. The actual switching takes place by just using an already prepared link. So the second method allows immediate switching, provided the preparation has been done, but it requires more state information for each data stream to be stored.

So a trade-off exists between both methods and depending on the environment, one or the other may be preferable. Apart from that, both solutions or embodiments presented are efficient, because the overhead carried in each frame is zero (the data stream identifier is assumed to be there anyway) and because the additional protocol for link switching is simple and requires only a very limited amount of frames to be exchanged, flexible, because a dynamic change of the assignment of data streams to links is possible by link switching, and order preserving as has been shown.

The invention has been described with reference to two preferred embodiments. It is, however, understood that a person skilled in the art may vary and modify details, by using the teachings of this description, without departing from the spirit and scope of this invention, as defined in the appended claims.

We claim:

1. Method for link switching when transmitting a data stream between two nodes (1 and 2, 11 and 12) of a network such that the order within the data stream is preserved, said two nodes being connected by at least two parallel links (link 1 . . . link n), of which only one is currently active, the method comprising the steps of:

a. generating a switch request in the sending node (sender 1, 11);
   b. attaching a sequence number to said switch request;
   c. transmitting said switch request with its sequence number from the sending node to the receiving node (receiver 2, 12) over at least one currently inactive link,
   d. determining, in the receiving node (2, 12), whether a received switch request carries a higher sequence number than a switch request received before and is thus acceptable, e. if so, sending to the sending node (1, 11) over said currently inactive link a switch response with the sequence number of said received switch request;

f. determining, in the sending node (1, 11), when receiving a switch response, whether its sequence number matches the sequence number sent with the last switch request and is thus acceptable; and g. depending on the result of the determining step f, activating an inactive link to transmit the data stream from the sending node to the receiving node.

2. Method according to claim 1, wherein the receiver (2) switches to said currently inactive link upon determining that a received (switch) request is acceptable, and the sender (1) switches to said currently inactive link upon determining that a received response is acceptable, thus effectively switching the data transmission to said currently inactive link.

3. Method according to claim 2, wherein the sending node (1) continues sending data over the currently active link until the sending node receives the switching response and switches to the currently inactive link.

4. Method according to claim 2, wherein the sending node (1), upon sending the request over the currently inactive link, suspends sending data and, upon receiving an acceptable response, resumes sending data over the so far inactive link.

5. Method for link switching when transmitting a data stream between two nodes (1 and 2, 11 and 12) of a network such that the order within the data stream is preserved, said two nodes being connected by at least two parallel links (link 1 . . . link n), of which only one is currently active, the method comprising the steps of:

a. generating a sweep request in the sending node (sender 1, 11);

b. attaching a sequence number to said sweep request;

c. transmitting said sweep request with its sequence number from the sending node to the receiving node (receiver 2, 12) over at least one currently inactive link, d. determining, in the receiving node (2, 12), whether a received sweep request carries a higher sequence number than a sweep request received before and is thus acceptable, e. if so, sending to the sending node (1, 11) over said currently inactive link a sweep response with the sequence number of said received sweep request;

f. determining, in the sending node (1, 11), when receiving a sweep response, whether its sequence number matches the sequence number sent with the last sweep request and is thus acceptable; and g. depending on the result of the determining step f, activating an inactive link to transmit the data stream from the sending node to the receiving node.

6. Method according to claim 5, wherein receipt of an acceptable request over a currently inactive link by the receiver (12) indicates to the receiver that this particular link is "clean", receipt of an acceptable response over a currently inactive link by the sending node (11) indicates to the sending node that this particular link is "clean", the sending node (11) effectively switches data stream transmission to any one of the inactive links at any time after the sending node has identified this particular link as "clean" and, upon receiving data from a "clean", inactive link, the receiver (12) effectively switches data stream reception to said inactive link, upon establishing data stream transmission over said inactive link, indicating to the sender and to the receiver that all other links are no more "clean".

7. Method according to claim 6, wherein requests and responses (FIG. 3) carrying the same sequence number are exchanged over a plurality of currently inactive links, and each acceptable request/response pair is taken as indicator that the particular link over which it was exchanged is "clean".

8. Method according to claim 7, wherein transmission of data is switched by the sender randomly to any one of said "clean", inactive links.

* * * * *